(12) United States Patent
Hsing

(10) Patent No.: US 9,086,557 B2
(45) Date of Patent: Jul. 21, 2015

(54) OPTICAL CABLE CONNECTION BOX WITH AUXILIARY DEVICE FOR GAP FILLING AND WATERPROOFING

(75) Inventor: Chih-Kuang Hsing, New Taipei (TW)

(73) Assignee: YU-FEN CHI (TW)

( * ) Notice: Subject to any disclaimer, the term of this patent is extended or adjusted under 35 U.S.C. 154(b) by 218 days.

(21) Appl. No.: 13/807,554

(22) PCT Filed: Jul. 2, 2010

(86) PCT No.: PCT/CN2010/074946
§ 371 (c)(1),
(2), (4) Date: Mar. 6, 2013

(87) PCT Pub. No.: WO2012/000205
PCT Pub. Date: Jan. 5, 2012

(65) Prior Publication Data
US 2013/0183019 A1 Jul. 18, 2013

(51) Int. Cl.
*G02B 6/44* (2006.01)
*H02G 15/013* (2006.01)
*H02G 15/115* (2006.01)

(52) U.S. Cl.
CPC ............ *G02B 6/4454* (2013.01); *G02B 6/4444* (2013.01); *H02G 15/013* (2013.01); *H02G 15/115* (2013.01); *G02B 6/4471* (2013.01); *G02B 6/4476* (2013.01)

(58) Field of Classification Search
CPC .................................................... G02B 6/4444
See application file for complete search history.

(56) References Cited

FOREIGN PATENT DOCUMENTS

| CN | 2403158 Y | 10/2000 |
| CN | 2411609 Y | 12/2000 |
| CN | 2426647 Y | 4/2011 |
| JP | 2002139634 A | 5/2002 |
| WO | 0038291 A1 | 6/2000 |

OTHER PUBLICATIONS

Machine translation of JP 2002-139634 to Kenji et al. (May 17, 2002), translation recorded Sep. 30, 2014.*

* cited by examiner

*Primary Examiner* — Jerry Rahll
(74) *Attorney, Agent, or Firm* — Volpe and Koenig, P.C.

(57) ABSTRACT

An optical cable connection box with an auxiliary device for gap filling and waterproofing is provided. The connection box includes a cable accessing end face, an auxiliary device for gap filling and waterproofing and an elastic shrinkable tube. The end face has a first hollow tubular column, and an optical cable to be waterproof processed by the elastic shrinkable tube passes therethrough as a dual cable after face to face bending, so that cable halfway splitting and halfway branching can be processed in the box without cutting off the cable. The auxiliary device cooperates with the optical cable in the hollow column, formerly a first waterproof structure where the auxiliary device is wrapped by the elastic shrinkable tube. At least the outside of the first hollow column and at least a portion of the auxiliary device are also wrapped by the elastic shrinkable tube forming a second waterproof structure.

18 Claims, 8 Drawing Sheets

OPTICAL CABLE CONNECTION BOX WITH AUXILIARY DEVICE FOR GAP FILLING AND WATERPROOFING

FIELD OF THE INVENTION auxiliary device for filling an interstice and proofing against water. For example, the cable splice enclosure can be a shell, closure, housing, or casing. In particular, the present invention relates to an improved cable splice enclosure capable of using an elastic shrinkable tube for waterproof treatment when an intermediate splice or a branching splice of a cable is operated.

BACKGROUND OF THE INVENTION

In the technical field of the wire transmission such as the telecommunication, cable TV and monitoring system, the fiber-optic cable is widely used for transmitting audio, data and video messages. The fiber-optic cable transmits messages to any designated location with the assistance of a cable splice enclosure to operate a connection and a splice of the cables.

The conventional fiber-optic cable is mostly used as an intermediate backbone cables. The cable splice enclosure is mostly used for a linear splice operation and a branching splice operation. The linear splice operation is an operation of connecting a truncated cable with one other cable having cores of same quantity therein. The branching splice operation is an operation of connecting a cable having more cores with a number of other cables having less cores therein. Comparatively, the present communication network has stepped into a wide band service era of fiber-to-the-home (FTTH). Massive fiber-optic fibers must be distributed to the optic equipments at user' sides by utilizing cable splice enclosures. Therefore, the cable splice enclosures are applicable not only to the linearly splice and the branching splice operation, but also necessarily applicable to an intermediately introduced branch splice operation for massive fiber-optic cables, which is an operation for further connecting some small quantity of unused cables split from a backbone cable with multi-core optical fibers in the middle portion via a cable splice enclosure to one other intermediate splice cable for connection to a new user side when a fiber-optic cable service is required for a customer. In most of such cases, the backbone fiber-optic cable, especially the fiber-optic cable in use, cannot be cut off.

In the prior art, the methods of waterproof treatment to an end surface of a cable splice enclosure allowing cables to pass therethrough for a direct splice or a branching splice operation include three types: the mechanical type, the heat-shrinkable type, and the elastic shrinkable tube type. The components of the mechanical type is complicated and of a high cost. The cost of the heat-shrinkable type is comparatively low. However, the heat-shrinkable type has some disadvantages of, for example, a necessity to use the torching when under construction, a difficulty of controlling a consistent quality, an adverse influence to water-proof effect caused by cable shaking and distortion, and a bad qualification inadequate to an underground fiber-optic cable installed in a manhole where water is accumulative all the year round although it is adequate to be used in a hanged or a wall-mounted environment. On the contrary, the elastic shrinkable tube type is the most convenient for the construction. Besides, the elastic shrinkable tube type also has the advantages of a highly consistent construction quality, an excellent water-proof effect, and a low cost of materials. Therefore, the adoption of the elastic shrinkable tube for performing the waterproof treatment to either the cables of a direct splice operation or those of a branching splice operation is the best choice for the constructor.

The elastic shrinkable tube is made of an elastic object having the qualities of a high elongation, a high tensile strength, and an excellent restoring rate. A hard tubular plastic object having a spiral shape extractable in a stripe manner from the internal side of the elastic shrinkable tube for enlarging the inside diameter is inserted in the elastic shrinkable tube. The method for waterproof treatment by using an elastic shrinkable tube is performed as follows. Firstly, put a portion of the elastic shrinkable tube with the enlarged inside diameter to cover the outer portion of the hollow cylindrical tube disposed on an end surface for a fiber-optic cable to pass therethrough, and put the other portion of the elastic shrinkable tube to cover the portion of the fiber-optic cable passing therethrough, connecting to and lying externally to the hollow cylindrical tube. After extracting the hard tubular plastic object having a spiral shape inserted inside the elastic shrinkable tube, the inside diameter of the elastic shrinkable tube restores back to a small inside diameter originally in the situation before it was enlarged. The small inside diameter is less than both the outside diameter of the hollow cylindrical tube and that of the fiber-optic cable, so that a shrinkage force in the diametrical direction is exerted on the outer portion of the hollow cylindrical tube and the portion of the fiber-optic cable lying externally to the hollow cylindrical tube, and a tight water-proof structure is formed accordingly.

In the prior art, however, the suitable water-proof methods for the cable splice enclosures using an end surface passing therethrough a fiber-optic cable going to be operated by a branch splicing of an intermediately introduced connection merely include two types: the mechanical type and the thermal shrinkable type. The reason why an elastic shrinkable tube for water-proof treatment cannot be used for an intermediately introduced branching splice operation of a fiber-optic cable is that, while preparing a fiber-optic cable for an intermediately introduced branching splice operation, it is necessary to be under the conditions that the fiber-optic cables and cores contained therein cannot be cut off, and that the fiber-optic cable has to be in a dual-cable manner to go into the above-mentioned cable splice enclosures for a connection and a splice operations. However, an elastic shrinkable tube, after shrinking, is difficult to tightly cover the interstice formed between the dual cables so that the waterproof effect cannot be achieved. Besides, there are specific technical standards for the bending of the fiber-optic cable. Generally, the bending curvature of an outdoor fiber-optic cable allows 3 mm in radius, which is 6 mm in diameter. Therefore, for the diameter of a hole of the hollow cylindrical tube for passing therethrough the fiber-optic cable in a dual-cable manner, the inside diameter of the longer side is larger than 6 mm based on the requirements of the general telecommunication supplier. However, the diameter of a general fiber-optic cable is merely 1.5 to 2 mm so that there will be a big breach between the rim of the hole and the fiber-optic cable. That is why it is not suitable to adopt an elastic shrinkable tube to perform the water-proof treatment. Thus, for the cable splice enclosures of the prior art, the water-proof treatment of the elastic shrinkable tube type can only be used for the direct splice and the branching splice operations, while the water-proof treatment of the heat-shrinkable type or the mechanical type should be used for the branch splicing of an intermediately introduced connection.

Therefore, if there is a feasible solution to improve the cable splice enclosure of the prior art so that a cable can pass through an end surface of a cable splice enclosure and a hollow cylindrical tube disposed thereon in a dual-cable manner, an elastic shrinkable tube is possibly used for the waterproof treatment. If the method of cable splice operation using the cable splice enclosure and waterproof treatment is feasibly standardized, not only the quality and safety of the construction are improved, but also the manufacturing and maintenance cost of the constructor are greatly lowered.

In order to overcome the drawbacks in the prior art, a cable splice enclosure is provided. The particular design in the present invention not only solves the problems described above, but also is easy to be implemented. Thus, the present invention has the utility for the industry.

SUMMARY OF THE INVENTION

In accordance with an aspect of the present invention, a cable splice enclosure is provided. The cable splice enclosure includes at least one end surface passing therethrough a first cable, wherein the first cable has a fiber-optic core therein and is bent in a U-shape, or is oppositely bent, without breaking the fiber-optic core, and the bent first cable has an inner part in the cable splice enclosure and an outer part out of the cable splice enclosure, at least a first hollow cylindrical tube formed on the end surface and passing therethrough the bent first cable, at least an auxiliary device cooperating with the outer part of the bent first cable to form a first waterproof structure, and at least a first shrinkable tube covering an outer surface of the first hollow cylindrical tube and an outer surface of the auxiliary device to form a second waterproof structure.

Moreover, the auxiliary device has at least one component selected from the group consisting of a cable bundling enclosure body, a fixing screw, a waterproof glue having characteristics of adhesion and plasticity, an elastomer waterproof pad and a combination thereof.

Moreover, the end surface has a second hollow cylindrical tube formed thereon for passing therethrough a second cable.

Moreover, the cable splice enclosure further includes a second shrinkable tube covering an outer surface of the second hollow cylindrical tube and a part of the second cable passing out of the second hollow cylindrical tube to form a third waterproof structure.

Moreover, the cable splice enclosure further includes at least a first cable fixture device fixing the inner part of the bent first cable, in which the first cable fixture device has at least one component selected from the group consisting of a fastening ring, a fastening band, a clamping joint and a combination thereof.

Moreover, the end surface has a first location passing therethrough a main cable. The cable splice enclosure further includes therein at least a collecting disk support with a collecting disk. The first location is disposed at a first linear path on which the main cable enters the cable splice enclosure without being blocked and interfered by the collecting disk. Therefore, it is possible to prevent the main cable from a necessity of being bent immediately because of a hinder by a cable collecting disk right after going into the cable splice enclosure having a small space that causes a problem of a poor transmission quality.

Moreover, the end surface has a second location passing therethrough a third cable, and the second location is disposed at a second linear path on which the third cable enters the cable splice enclosure without being blocked and interfered by the collecting disk. The operation related to the fixing, storing, and allocating of the cable collecting support can still follow an originally designed technical operation procedure to reduce the adverse influence caused by changing the location for passing therethrough a cable. Accordingly, the application field of the end surface for the cable to pass therethrough is promoted, and the technical quality of the related operation is assured as well.

Moreover, the cable splice enclosure further includes a second cable fixture device fixing the collecting disk support, wherein the second cable fixture device fixes the collecting disk support at a specific position corresponding to the second location.

Moreover, the first shrinkable tube is one selected from the group consisting of an elastic shrinkable tube, a heat-shrinkable tube and a combination thereof.

In accordance with another aspect of the present invention, a cable splice enclosure is provided. The cable splice enclosure includes at least one end surface passing therethrough a cable bent into a first part having a U-shaped part in the cable splice enclosure and a second part having a linear part out of the cable splice enclosure, wherein the linear part of the cable has an interstice, at least a hollow tube formed on the end surface and passing therethrough the cable, at least an auxiliary device cooperating with the linear part of the cable and filling the interstice to form a first waterproof structure, at least a first shrinkable device covering an outer surface of the hollow tube and an outer surface of the auxiliary device to form a second waterproof structure, and at least a cable fixture device fixing the U-shaped part of the cable.

In accordance with a further aspect of the present invention, a cable splice enclosure is provided. The cable splice enclosure includes an end surface separating the cable splice enclosure into an inner part and an outer part, at least a hollow tube configured on the end surface and passing therethrough a cable, at least an auxiliary device filling an interstice to form a first waterproof structure, at least a shrinkable device covering an outer surface of the hollow tube and an outer surface of the auxiliary device to form a second waterproof structure, and at least a cable fixture device being used to fix the portion of the cable in the inner part of the cable splice enclosure. The cable passing through the hollow tube is arranged to extend from the outer part to the inner part through the hollow tube, leaves a portion in the inner part, and leave from the inner part through the hollow tube toward the outer part. Meanwhile, the cable has a first segment before extending into the inner part and a second segment leaving from the inner part. The first and the second segments have an interstice therebetween to which the interstice is necessary to be filled by the auxiliary device.

The above objectives and advantages of the present invention will become more readily apparent to those ordinarily skilled in the art after reviewing the following detailed descriptions and accompanying drawings.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

First Embodiment

Figure 1A:
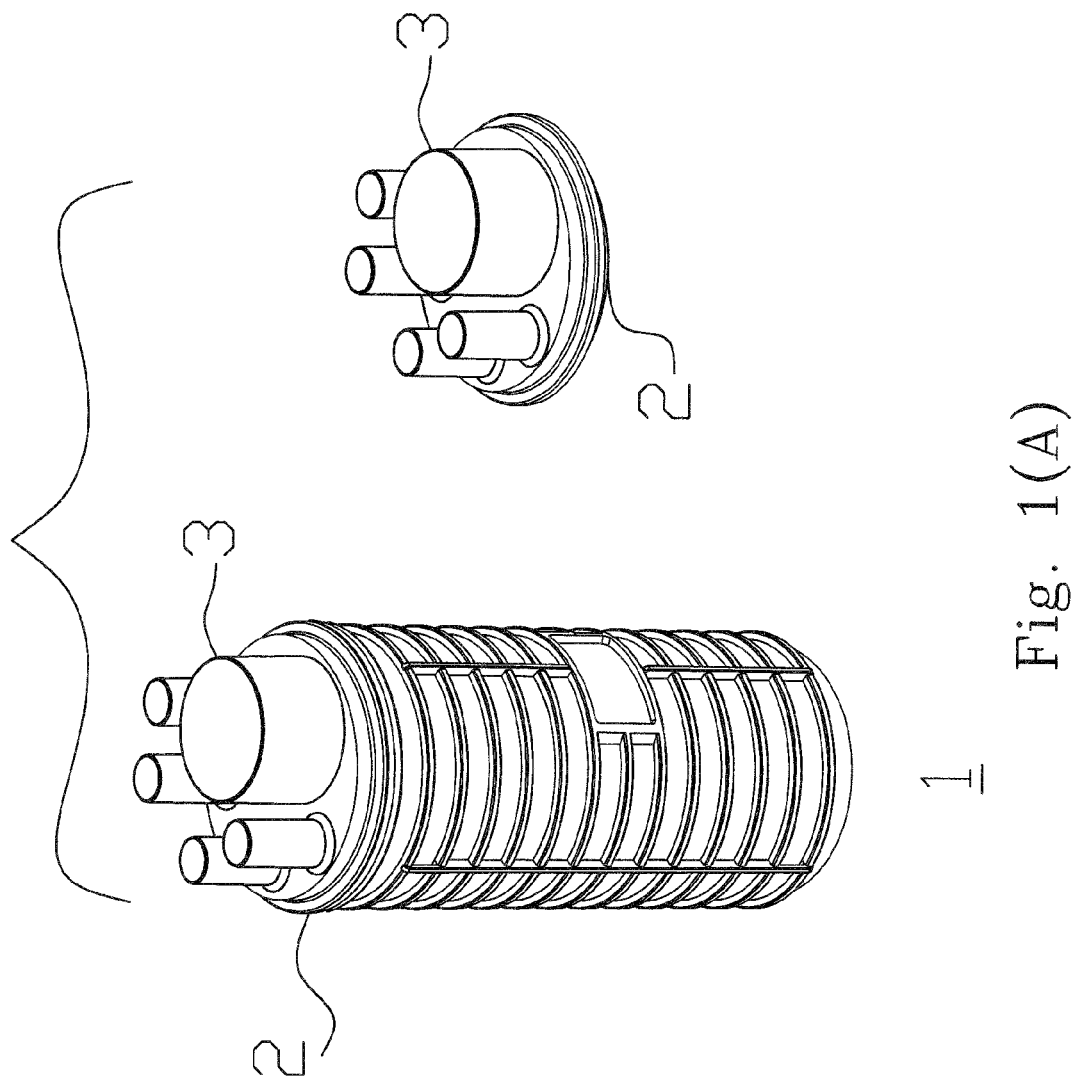
FIGS. 1(A)~1(E) show a cable splice enclosure having an auxiliary device for filling an interstice and proofing against water according to a first embodiment of the present invention.
Figure 1B:
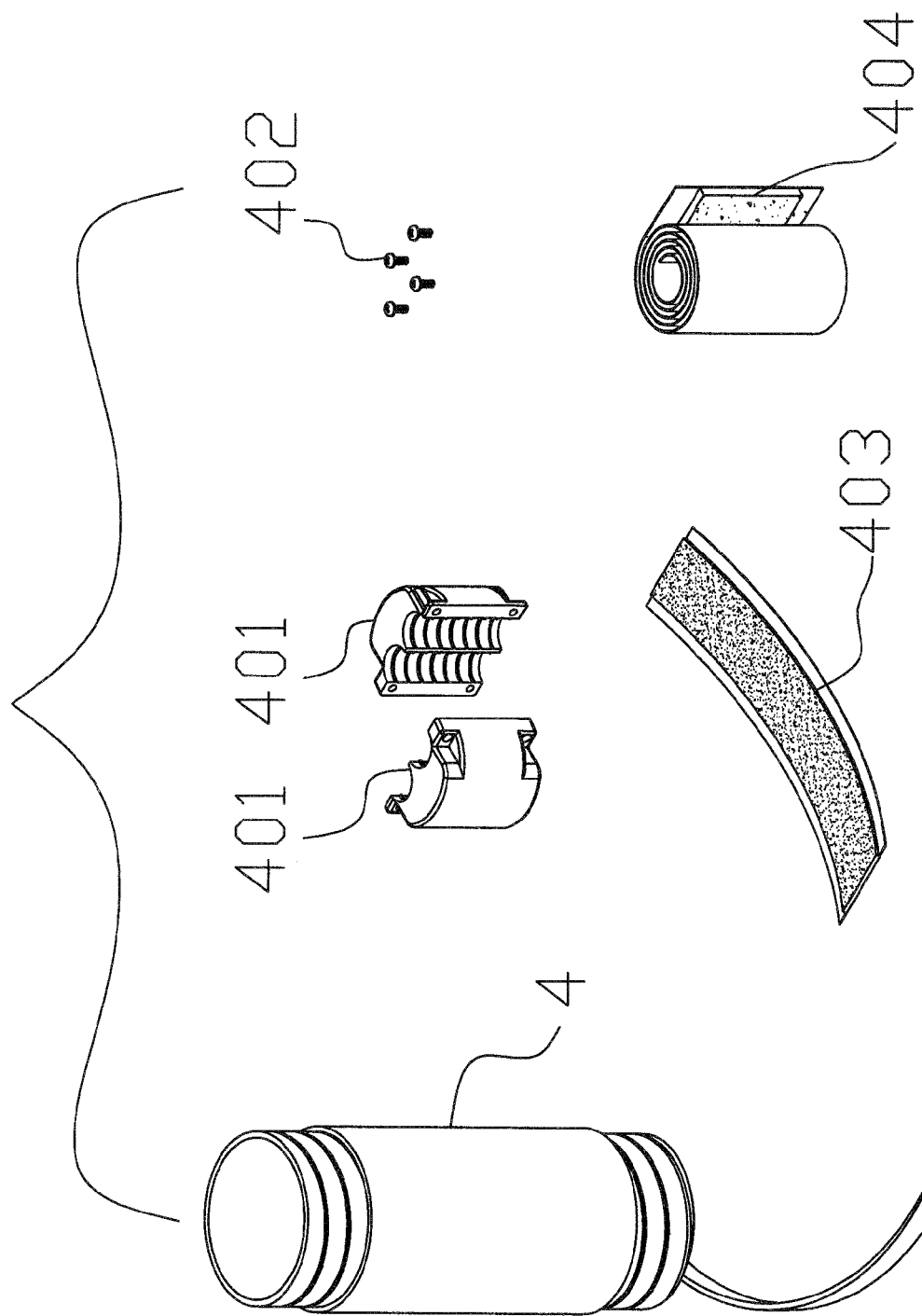
Figure 1C:
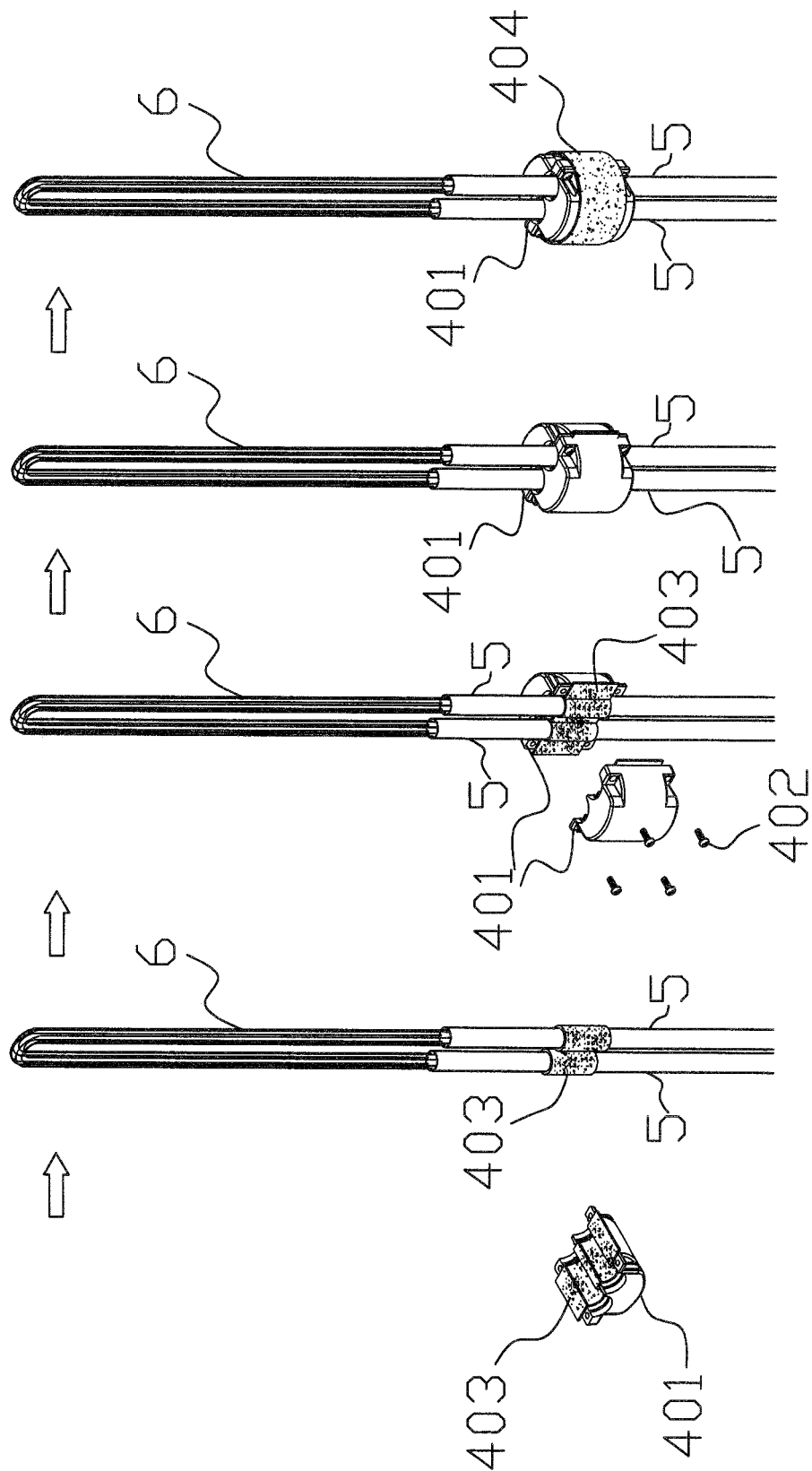
Figure 1D:
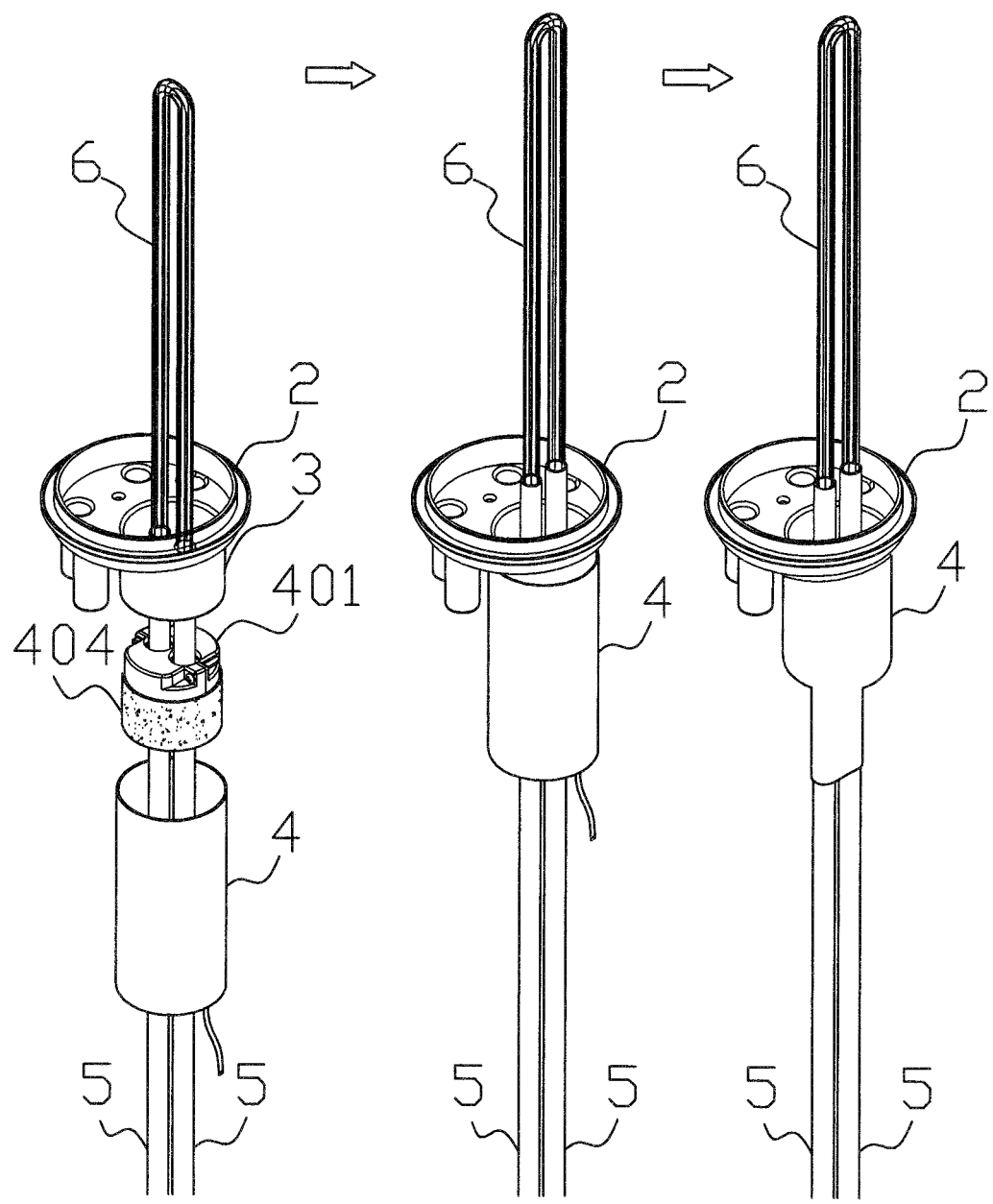
Figure 1E:
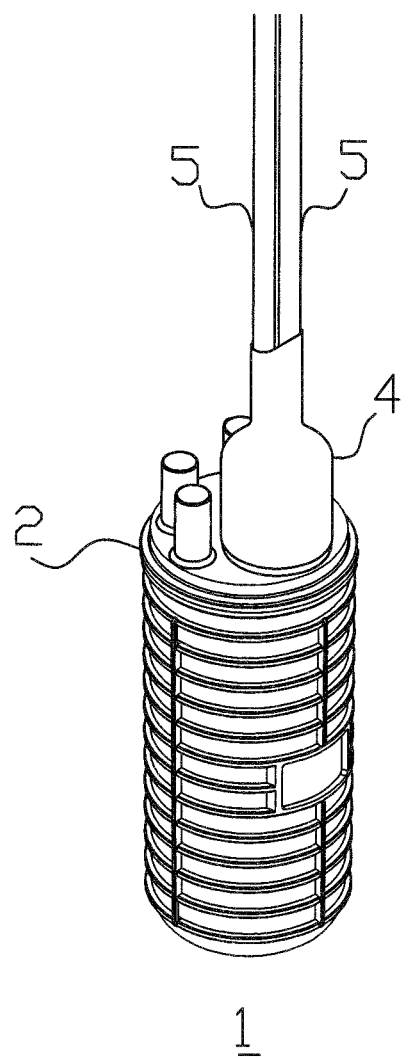

Please refer to FIGS. 1(A)~1(E), which show a cable splice enclosure 1 having an auxiliary device for filling an interstice and proofing against water according to a first embodiment of the present invention. The cable splice enclosure 1 includes an end surface 2 for a cable to pass therethrough. The end surface 2 has a hollow cylindrical tube 3 formed thereon, as shown in FIG. 1(A). The cable splice enclosure further includes an auxiliary device for filling an interstice and proofing against water, and an shrinkable tube 4 which can be an elastic shrinkable or a heat-shrinkable one. As shown in FIG. 1(B), the auxiliary device includes two pieces of bundling bodies 401, fixing screws 402, a waterproof double-faced adhesive tape 403, and an elastomer waterproof single-faced adhesive tap 404. The two pieces of bundling bodies 401 are in a semi-cylinder shape each having a concave space for containing each of the dual cables therein respectively for tightly bundling the cables. The waterproof double-faced adhesive tape 403 has characteristics of adhesion and plasticity. The elastomer waterproof single-faced adhesive tap 404 could be alternatively replaced by other applicable glues. When a cable, bent in a double-folded shape, a U shape, or other possible shapes without being cut off to have a form in a dual-cable manner is ready to pass through the hollow cylindrical tube 3 formed on the end surface 2 and to go into the cable splice enclosure 1, the operation of waterproof treatment is proceeded as described hereinafter. There are another interstice formed possibly by different cable combinations and are also applicable to the present invention. For example, a cable having a U-shaped part in the cable splice enclosure and a linear part out of the cable splice enclosure. An interstice is formed on the linear part of the cable in a dual-cable manner. In another case, a cable extends from the outer part to the inner part of the cable splice enclosure through the hollow tube, leaves a portion in the inner part thereof, and leaves from the inner part through the hollow tube toward the outer part. The cable has a first segment before extending into the inner part and a second segment leaving from the inner part. Another interstice is formed between the first and the second segments. Firstly, the waterproof double-faced adhesive tape 403 having characteristics of adhesion and plasticity is put and laid at one of the semi-cylindrical bundling bodies 401 having a concave space for containing each of the dual cables therein respectively. The waterproof adhesive tape 403 having characteristics of adhesion and plasticity is used to encompass a joint portion of the fiber-optic cable 5 for the intermediately introduced branching splice and the bundling bodies 401 for tightly bundling the cable in a curled type. Fasten the joint portion by using the fixing screws 402 to tightly combine the two pieces of the semi-cylindrical bundling bodies 401 to form a waterproof structure of an integrated cylindrical body. After removing the excess of the waterproof double-faced adhesive tape 403 having characteristics of adhesion and plasticity squeezed out from the gap between the bundling bodies 401 after tightly fastening the fixing screws 402, an elastomer waterproof single-faced adhesive tape 404 is used to encompass the outer surface of the integrated cylindrical bundling body formed by combining the two pieces of the semi-cylindrical bundling bodies 401. Accordingly, a first waterproof structure is formed among each of the dual cables 5 and the bundling bodies 401, as shown in FIG. 1(C). Besides, the fiber-optic cable 5 and the first waterproof structure therewith, intended to be operated by an intermediately introduced branching splice, are inserted into and covered by an elastic shrinkable 4 to proceed a waterproof treatment, which can be an elastic shrinkable tube, an heat-shrinkable tube or a combination thereof. The fiber-optic cable 5 with the first waterproof structure is bended without breaking the cores contained therein, passes through the first hollow cylindrical tube 3, is inserted into the cable splice enclosure 1 in a dual-cable manner, and then is fixed thereto. A shrinkable tube 4 bundles and covers an outer portion of the first hollow cylindrical tube 3 and a part of the bent cable lying externally to the first hollow cylindrical tube 3 to form a second waterproof structure, as shown in FIG. 1(D). Therefore, a waterproof treatment to the joint portion of the cable 5 intended to be intermediately introduced branching splice operated and the end surface 2 for the cable 5 to pass therethrough is completed, as shown in FIG. 1(E). Accordingly, the cable splice enclosure 1 of the present invention for slicing a cable 5 therethrough is also suitable for any kind of the cable splice method and/or a preparation for a cable splice requirement.

Figure 2:
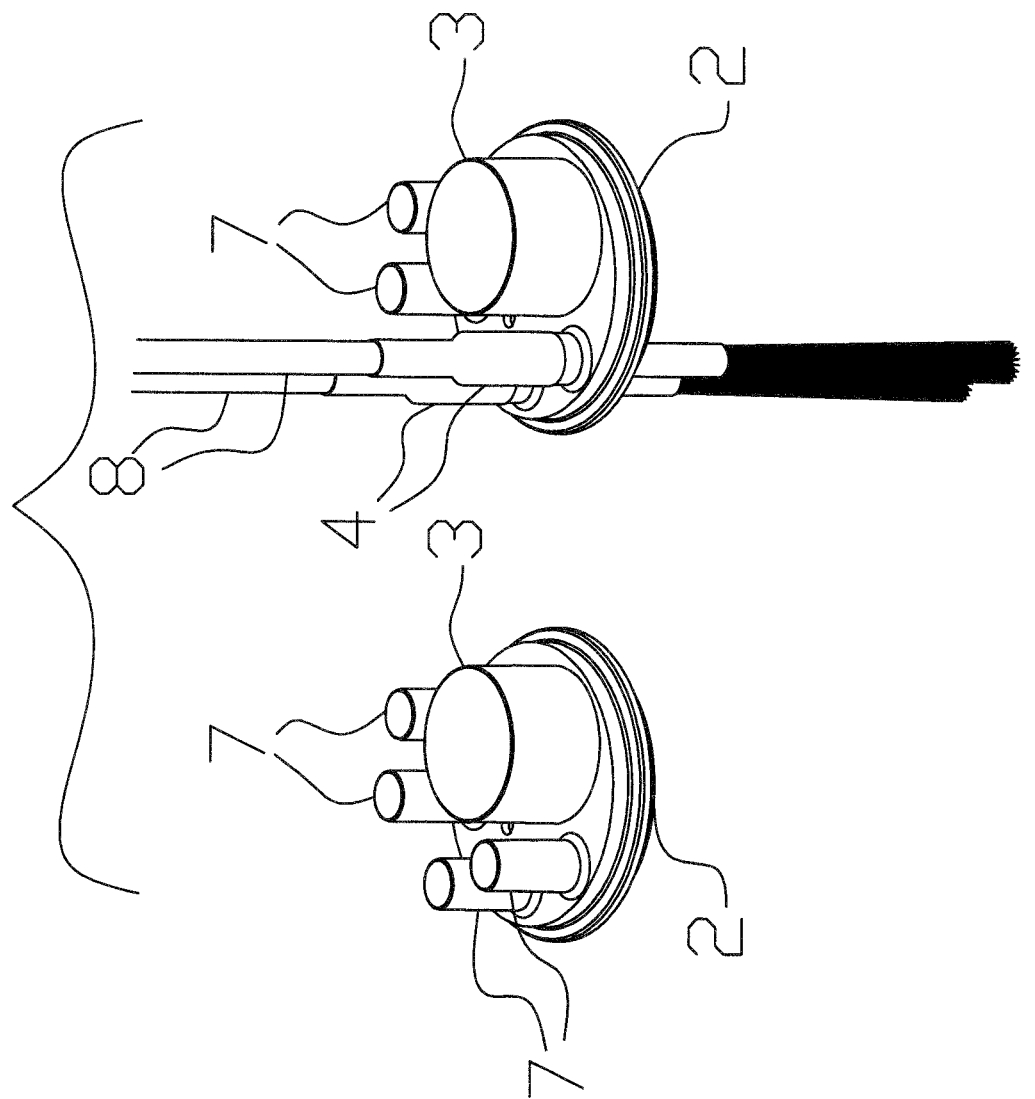
FIG. 2 shows an end surface on the cable splice enclosure for a fiber-optic cable to pass therethrough according to the first embodiment of the present invention.

Please refer to FIG. 2, which shows an end surface 2 on the cable splice enclosure 1 for a fiber-optic cable to pass therethrough according to the first embodiment of the present invention. A second hollow cylindrical tube 7 for a fiber-optic cable 8 intended to be proceeded by an direct splice or a branching splice operation to pass therethrough and further go into the cable splice enclosure 1 is further formed on the end surface 2. A shrinkable tube 4 is used for simultaneously bundling and covering both an outer surface of the second hollow cylindrical tube 7 and a part of the cable 8 passing out of the second hollow cylindrical tube 7 to form a third waterproof structure, as shown in FIG. 2. If the second hollow cylindrical tube 7 or the outside diameter of the cable 8 is a littler smaller or the surface of the cable 8 is slightly scratched, an elastomer waterproof single-faced adhesive tape 404 is additionally used to surround the cable 8 to enlarge its outside diameter to properly fit the dimension of the inside diameter of the shrinkable tube 4 after bundling and covering the cable 8, and to make up the scratch on the surface of the cable 8.

Figure 3:
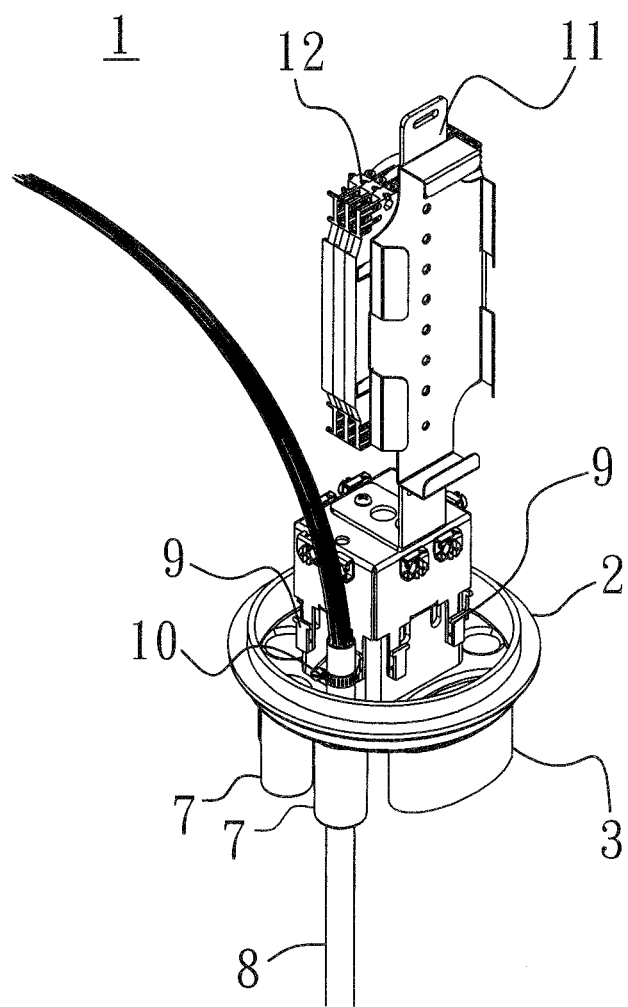
FIG. 3 shows the interior of the cable splice enclosure in one view according to the first embodiment of the present invention.

Please refer to FIG. 3, which shows the interior of the cable splice enclosure 1 in one view according to the first embodiment of the present invention. A first cable fixture device 9 is disposed at the interior of the cable splice enclosure 1. The first cable fixture device 9 can be a fastening ring, a fastening band, a clamping joint, or a combination thereof. The first cable fixture device 9 fixes the cable 8 which lies at the inner part of the cable splice enclosure 1 by using a stainless steel fastening ring 10.

Figure 4:
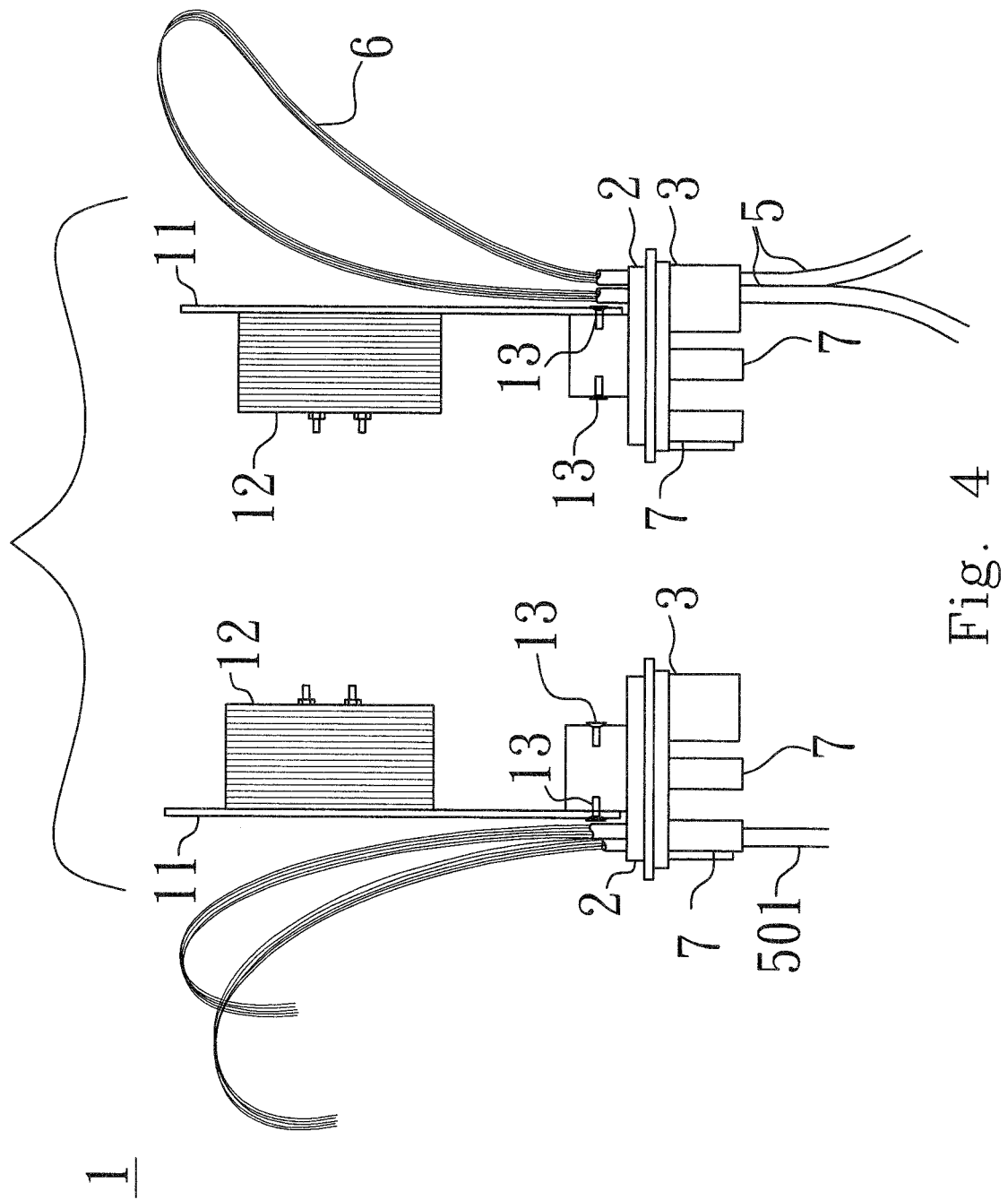
FIG. 4 shows the interior of the cable splice enclosure in another view according to the first embodiment of the present invention.

Please refer to FIG. 4, which shows the interior of the cable splice enclosure 1 in another view according to the first embodiment of the present invention. A collecting support 11 for collecting fiber-optic cables is further disposed at the interior of the cable splice enclosure 1. A first location on the end surface 2 of the first hollow cylindrical tube 3 for a main cable 5 to pass therethrough is disposed at a linear path on which the main cable 5 enters the cable splice enclosure 1 without being blocked and interfered by the collecting disk 12 disposed on the collecting support 11. A second cable fixture device 13 is further disposed at the interior of the cable splice enclosure 1. The second cable fixture device 13 also can be a fastening ring, a fastening band, a clamping joint, or a combination thereof. The second cable fixture device 13 fixes the collecting support 11 at a different specific position corresponding to a second location for passing therethrough another main cable 5 for an intermediately introduced branching splice operation or a main cable 501 for a direct splice operation, as shown in FIG. 4. Furthermore, the second location on the end surface 2 of the second hollow cylindrical tube 7 for a main cable 5 to pass therethrough is disposed at a linear path on which the main cable 8 enters the cable splice enclosure 1 without being blocked and interfered by the collecting disk 12 disposed on the collecting support 11, as shown in FIG. 3.

Based on the above-mentioned description for the first embodiment, the cable splice enclosure having an auxiliary device for filling an interstice and proofing against water of the present invention overcomes a variety of disadvantages of the prior art, such as the insufficiency of the function, high cost, a difficulty of controlling a consistent quality and keeping the construction under a safe environment. In addition, the standardization to the tools and operation method effectively improves the quality and safety of the construction and greatly lowers the manufacturing and maintenance costs of the constructor.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A cable splice shell, comprising:
    at least one end surface passing therethrough a first cable, wherein the first cable has a fiber-optic core therein and is bent in a U-shape without breaking the fiber-optic core, and the bent first cable has an inner part in the cable splice shell and an outer part out of the cable splice shell;
    at least a first hollow cylindrical tube formed on the end surface and passing therethrough the bent first cable;
    at least an auxiliary device cooperating with the outer part of the bent first cable to form a first waterproof structure; and
    at least a first elastic shrinkable tube covering an outer surface of the first hollow cylindrical tube and an outer surface of the auxiliary device to form a second waterproof structure.

2. The cable splice shell according to claim 1, wherein the auxiliary device has at least one component selected from the group consisting of a cable bundling shell body, a fixing screw, a waterproof glue having characteristics of adhesion and plasticity, an elastomer waterproof pad and a combination thereof.

3. The cable splice shell according to claim 1, wherein the end surface has a second hollow cylindrical tube formed thereon for passing therethrough a second cable.

4. The cable splice shell according to claim 3, further comprising a shrinkable tube covering an outer surface of the second hollow cylindrical tube and a part of the second cable passing out of the second hollow cylindrical tube to form a third waterproof structure, wherein the shrinkable tube is one selected from the group consisting of a second elastic shrinkable tube, a heat-shrinkable tube and a combination thereof.

5. The cable splice shell according to claim 1, further comprising at least a first cable fixture device fixing the inner part of the bent first cable.

6. The cable splice shell according to claim 5, wherein the first cable fixture device has at least one component selected from the group consisting of a fastening ring, a fastening band, a clamping joint and a combination thereof.

7. The cable splice shell according to claim 1, wherein the end surface has a first location passing therethrough a main cable, the cable splice shell further comprises therein at least a collecting disk support with a collecting disk, and the first location is disposed at a first linear path on which the main cable enters the cable splice shell without being blocked and interfered by the collecting disk.

8. The cable splice shell according to claim 7, wherein the end surface has a second location passing therethrough a third cable and the second location is disposed at a second linear path on which the third cable enters the cable splice shell without being blocked and interfered by the collecting disk.

9. A cable splice shell according to claim 8, further comprising a second cable fixture device fixing the collecting disk support, wherein the second cable fixture device fixes the collecting disk support at a second specific position corresponding to the second location.

10. A cable splice shell, comprising:
    at least one end surface passing therethrough a cable bent into a first part having a U-shaped part in the cable splice shell and a second part having a linear part out of the cable splice shell, wherein the linear part of the cable has an interstice;
    at least a hollow tube formed on the end surface and passing therethrough the cable;
    at least an auxiliary device cooperating with the linear part of the cable and filling the interstice to form a first waterproof structure; and
    at least an elastic shrinkable device covering an outer surface of the hollow tube and an outer surface of the auxiliary device to form a second waterproof structure.

11. The cable splice shell according to claim 10, wherein the auxiliary device has at least one component selected from the group consisting of a cable bundling shell body, a fixing screw, a waterproof glue having characteristics of adhesion and plasticity, an elastomer waterproof pad and a combination thereof.

12. The cable splice shell according to claim 10, further comprising at least a cable fixture device fixing the U-shaped part of the cable.

13. The cable splice shell according to claim 12, wherein the cable fixture device has at least one component selected from the group consisting of a fastening ring, a fastening band, a clamping joint and a combination thereof.

14. A cable splice shell, comprising:
    an end surface separating the cable splice shell into an inner part and an outer part;
    at least a hollow tube configured on the end surface and passing therethrough a cable, wherein the cable extends from the outer part to the inner part through the hollow tube, leaves a portion in the inner part, and leaves from the inner part through the hollow tube toward the outer part, the cable has a first segment before extending into the inner part and a second segment leaving from the inner part, and the first and the second segments have an interstice therebetween;
    at least an auxiliary device filling the interstice; and
    at least an elastic shrinkable device covering an outer surface of the hollow tube and an outer surface of the auxiliary device to form a first waterproof structure.

15. The cable splice shell according to claimed 14, wherein the auxiliary device fills the interstice to form a second waterproof structure.

16. The cable splice shell according to claim 14, wherein the auxiliary device has at least one component selected from the group consisting of a cable bundling shell body, a fixing screw, a waterproof glue having characteristics of adhesion and plasticity, an elastomer waterproof pad and a combination thereof.

17. The cable splice shell according to claim 14, further comprising at least a cable fixture device fixing the portion of the cable in the inner part.

18. The cable splice shell according to claim 17, wherein the cable fixture device has at least one component selected from the group consisting of a fastening ring, a fastening band, a clamping joint and a combination thereof.

* * * * *